Nov. 18, 1941.  K. M. HAMMELL  2,263,420
CIRCUIT FOR ELECTRIC RANGES
Filed July 17, 1939    4 Sheets-Sheet 1
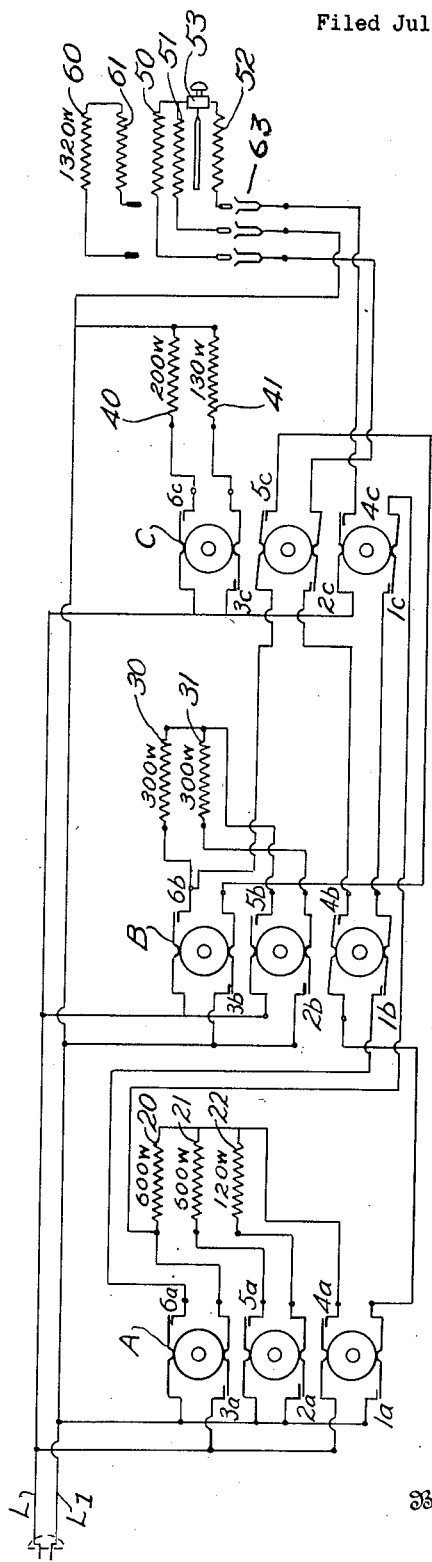
Inventor
Kemper M. Hammell
By Owen & Owen
Attorneys Nov. 18, 1941.   K. M. HAMMELL   2,263,420
CIRCUIT FOR ELECTRIC RANGES
Filed July 17, 1939    4 Sheets-Sheet 2
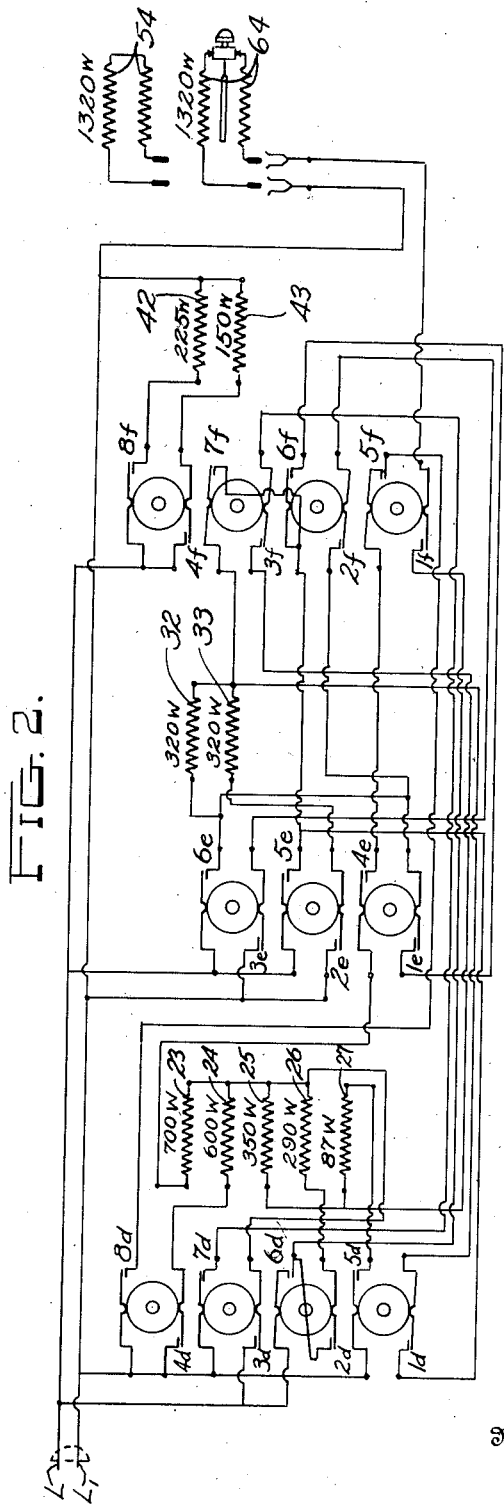
Inventor
Kemper M. Hammell
By Owen & Owen
Attorneys Nov. 18, 1941.     K. M. HAMMELL     2,263,420
CIRCUIT FOR ELECTRIC RANGES
Filed July 17, 1939     4 Sheets-Sheet 3
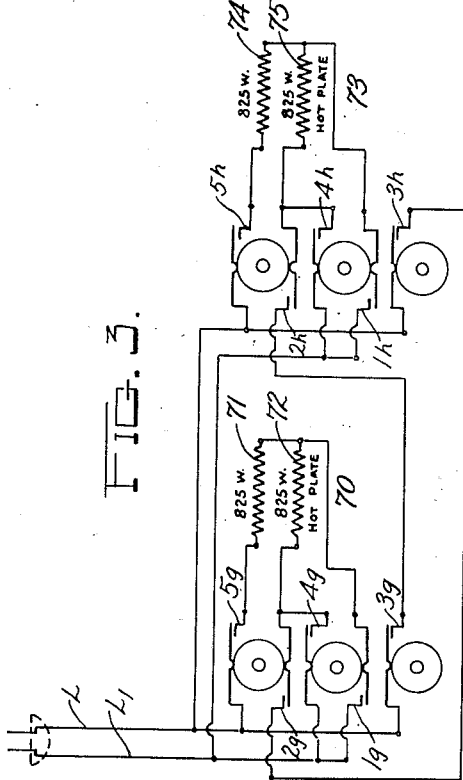
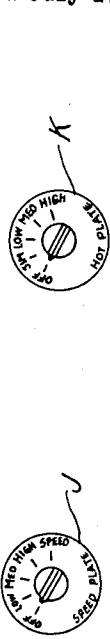
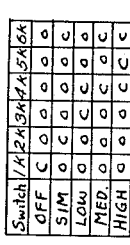
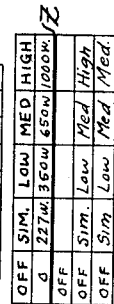
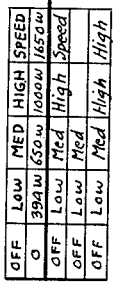
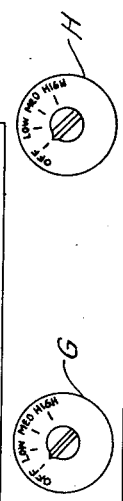
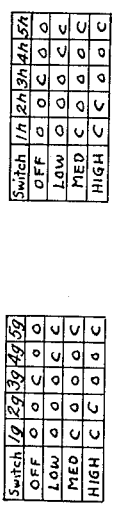
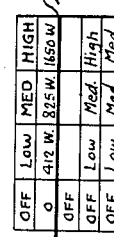
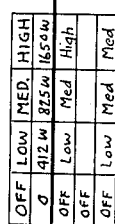
Inventor
Kemper M. Hammell
By Owen & Owen
Attorneys

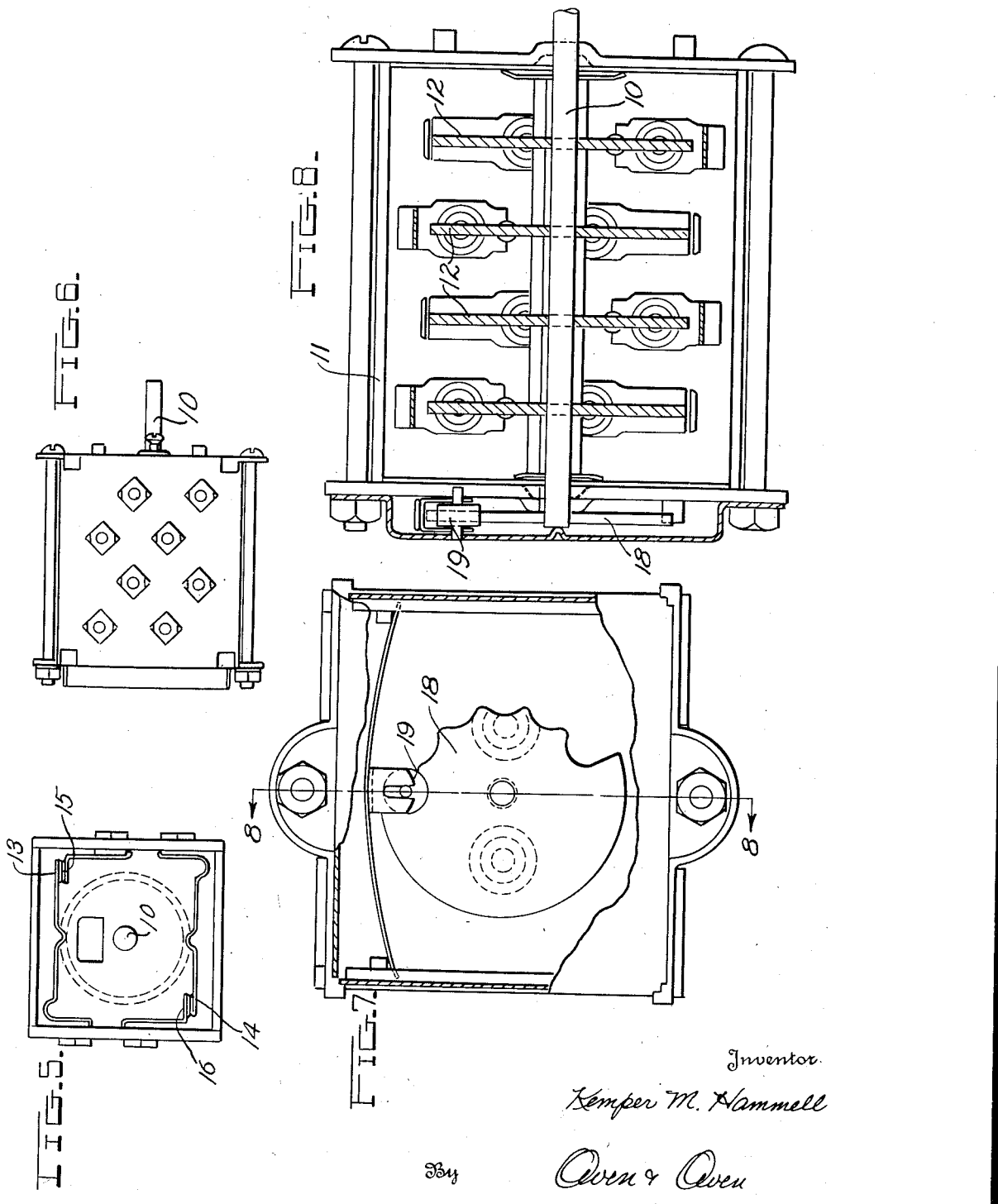

Patented Nov. 18, 1941

2,263,420

UNITED STATES PATENT OFFICE 2,263,420

CIRCUIT FOR ELECTRIC RANGES

Kemper M. Hammell, Toledo, Ohio, assignor to The Swartzbaugh Manufacturing Company, Toledo, Ohio, a corporation of Ohio Application July 17, 1939, Serial No. 284,891

3 Claims. (Cl. 219—20)

This invention relates to circuits for small electric ranges.

In the use of small ranges as domestic appliances it is necessary to limit the power drawn from ordinary house wiring to about 1650 watts in order to comply with the safety requirements of the power companies and underwriters' laboratories. It has heretofore been common to furnish equipment capable of drawing considerably more than permissible maximum power and to incorporate therein some means to limit the power drawn by the appliance at any one time to less than the designated quantity. Such current limiting devices may be broadly classified as either mechanical or electrical. The mechanical type includes those in which movement of one switch to a given position mechanically locks another switch so that it cannot be turned and also includes those mechanically connected switches which move together so that as one switch is moved to power increasing position its companion is moved to decrease the power supplied to its controlled element.

The electrical current limiting devices include various interlocked electrical circuits. This type, as well as the mechanical types heretofore employed, have all had one characteristic in common. When one selected unit was turned to its "high" position of maximum current consumption, some other unit was turned completely off. In the case of the electrical types this condition might exist even through the indicator of the switch of the de-energized unit would lead the user to believe that the unit was connected and heated. Appliances of this type are found to be confusing to the operator and difficult to use because of this characteristic.

The primary object of the present invention is the provision of an interlocking circuit for a plurality of heating units in which each unit is turned off only when its associated switch so indicates. Otherwise stated, the arrangement is such that, while the power supplied to a particular unit may be decreased by movement of a switch not directly associated therewith, the unit may never be entirely cut off except intentionally by the user.

Another object of the invention is the provision of a novel means to limit the current consumption in one unit of an electric appliance by reducing the voltage drop across the unit under certain conditions and to utilize the heat generated by the voltage reducing means.

Another object of the invention is the provision of a small multi-unit domestic range in which the power consumption is limited to a predetermined quantity and in which heating units are provided to give the entire permissible power output in one unit, but in such a manner that no other unit will be de-energized when an attempt is made erroneously to establish the circuit giving such output.

Other objects and advantages of the invention will become apparent as the description proceeds, reference being had to the accompanying drawings, in which—

Figure 1 is a circuit diagram and position and power tabulation therefor of one form of the present invention;

Fig. 2 is a circuit diagram and position and power tabulation for another form of the present invention, embodying voltage reducing means for one of the elements;

Figs. 3 and 4 are circuit diagrams and position and power tabulations of simplified forms of the present invention;

Fig. 5 is a partially diagrammatic central vertical section of a switch which may be used in connection with the present invention;

Fig. 6 is a top plan view thereof;

Fig. 7 is an enlarged rear end view, with parts broken away, of the switch shown in Figs. 5 and 6, and Fig. 8 is a longitudinal section, with parts in full, on line 8—8 of Fig. 7.

Referring to the drawings, Figs. 1, 2, 3 and 4 are circuit diagrams showing the invention in several aspects and in each instance switch dials are shown and beneath each of them is a position tabulation showing which contacts are closed and which contacts are open for the several positions. In addition, each circuit diagram is accompanied by a power tabulation showing the possible combinations of power distribution between the several heating elements. In each instance the switch is of the type shown in Figs. 5, 6, 7 and 8 and includes a shaft 10 journaled in a suitable housing 11 and carrying a plurality of cams 12, each of which operates upper and lower movable contacts 13 and 14 which cooperate with respective stationary contacts 15 and 16 to close various circuits as hereinafter described. As shown in Fig. 7, an indexing cam 18 is fixed to the extreme end of shaft 10 and cooperates with a spring pressed roller 19 to give the proper step by step movement of the shaft 10 to its various operating positions.

In connection with the circuit diagrams, the several cams 12 are indicated merely by circles and the contacts 13—15, 14—16 are indicated diagrammatically by lines. Each pair of contacts will hereinafter be referred to as a switch. It will be appreciated that in the interest of clarity the shaft 10 has been omitted from the circuit diagrams as well as the outline of the various cams.

The invention is based on the acknowledgment of two basic facts in connection with cooking. First, that in cooking a meal not all portions thereof are started at the same time, and second, that once the contents of a cooking vessel have been brought up to cooking temperature, only a relatively small heat input is necessary to maintain the temperature and continue the cooking. In further explanation of the first fact, assuming that a roast, potatoes and two vegetables are to comprise the meal, the roast will be started first, some considerable time prior to the time set for serving, the potatoes will either be cooked with the roast or will be put on to cook well in advance of the time set but later than the roast, and the vegetables will be started a relatively short time, such as 15 or 20 minutes, before the time set for serving, and before the potatoes and roast are done. As to the second fact, once the vessel used for the roast has been pre-heated, using for example 1320 w., an input of 500 w. is ample to maintain the roasting temperature. In boiling potatoes or vegetables, the vessel and contents may be quickly heated on 1320 w. or even on 950 w. and the cooking continued with an input as low as 120 w. providing a covered cooking vessel is used.

Referring particularly to Fig. 1, the invention is shown applied to a range having a combination of four heating units which may be used together or separately as hereinafter described. The first unit is designated a "Speed plate," being an electric heating unit having a high heat capacity and including heating elements 20, 21 and 22, designated in the drawings according to their capacity as 600 w., 600 w., and 120 w., respectively. The voltage between lines L and L₁ is assumed to be 110 v. and the heating elements are proportioned accordingly. The second heating unit is designated a "Hot plate" and is of lower capacity than the previously described unit including, for example, two heating elements 30 and 31 having a capacity of 300 w. each.

The third and fourth heating elements are simultaneously or alternatively used in connection with the same switching unit and may include a casserole or heating vessel recessed in the top of the range, having two heating elements 40 and 41 of 200 w. and 130 w. capacity, respectively, and a roaster or enclosed space heating device having heating elements 50, 51 and 52 which may be connected to give 500 w. or 1320 w. and may be controlled by a thermostat 53 in addition to the switches hereinafter described. As indicated in the drawing, the roaster may be replaced by a broiler unit of 1320 w. capacity from coils 60 and 61. Units of this character are well known, standard articles of commerce, and no claim is made to their novelty. It will be apparent that the units may readily be incorporated in an oven of a range and may be upper and lower heating units therein as is common in electric ranges.

Three switching units A, B and C are employed to control the connections to the several units. The roaster and broiler units are preferably provided with an attachment plug 63 so that one may replace the other at the desire of the user. The line connections to these two units, however, are established in part and controlled through switch C.

Switching unit A is directly associated with the speed plate and includes six independent switches which are numbered 1a to 6a. Each of the switches comprises a set of contacts 13 and 15, or 14 and 16, and are controlled by cams 12 as previously described. In addition to the "off" position, the switching unit A has five heating positions indicated as "simmer" (120 w.), "low" (300 w.), "medium" (600 w.), "high" (720 w.), and "speed" (1320 w.). Below the dial indicated for the switching unit appears a switch position table showing which of the switches 1a to 6a are closed to establish the several heating circuits in this unit. Thus, when the switching unit A is in its "off" position, switch 1a is closed and switches 2a, 3a, 4a, 5a and 6a are open. In the "simmer" position switches 1a, 2a and 4a are closed and switches 3a, 5a and 6a are open. The table may be referred to for the positions of the switches for the remaining heats. Similar tabulations are made for switching units B and C.

At the bottom of Fig. 1 is shown a heat tabulation for the several heating units. The tabulation is so arranged as to indicate in the portion below the heavy line Z the combinations obtainable from the various units, any horizontal combination being available to the user. For example, using the first group below the heavy line, the tabulation indicates that with the hot plate "off," the speed plate may be used in any of its positions including the "speed" or 1320 w. position, while the casserole may be turned through any of its positions "low," "medium" or "high."

Taking the second horizontal combination, it will be seen that the speed plate is limited to 720 w. or the "high" position whenever the hot plate is turned on and the latter will give any of its heats up to and including the "high" heat of 600 w. The effect of turning the hot plate on, therefore, is to reduce the output of the speed plate from "speed" to "high" in the event that the user has previously turned switching unit A to the "speed" position.

In the third combination, the casserole and roaster are both connected, switching unit C being turned to its fourth "on" position. The casserole, as indicated, is connected for 130 w. and the roaster for 500 w. in this position, being heat holding positions in each instance. With this connection the hot plate is automatically limited to the "medium" 300 w. heat even though the user has previously turned switching unit B to "high" for the 600 w. heat and the speed plate is automatically limited to "high" or 720 w. even though it has previously been turned to the "speed" position to give 1320 w.

The fourth horizontal combination relates very closely to the third and indicates that with the roaster on "low" utilizing only the 500 w. coil, the speed plate is limited to "high" and the hot plate is "medium."

With the broiler connected or with the roaster on its "high" heat giving 1320 w., it will be seen from the fifth horizontal tabulation that the speed plate is limited to "simmer" or 120 w. and the hot plate to "low" or 150 w. Thus, even though the broiler is being used, towards the end of the period allotted for the preparation of a meal, vegetables or the like will continue to cook in vessels placed on the speed plate and hot plate. No cooking unit is ever turned completely off and the "simmer" and "low" connections must be consciously and manually established, in order to throw the 1320 w. into the broiler or roaster.

Limitation of the output of the various units is accomplished by interposing certain switches of the several switching units A, B and C in series in the circuits of one coil of the speed plate, one coil of the hot plate and in the "roaster-broiler" circuit.

The upper 600 w. coil in the speed plate, coil 20, is connected to line L through switch 4a and through switches 6a, 1b and 1c in series, to line $L_1$. All three of these switches must therefore be closed to complete the circuit to this coil. The switch position tabulation for switching unit B indicates that switch 1b is closed only in the "off" position, while the tabulation for switching unit C indicates that switch 1c is closed until the first "roaster-broiler" position is attained. While the coil 20 is thus de-energized by switching units B and C the speed plate is still kept on "high" by reason of the remaining coils so that, as above noted, the only result of opening the circuit to coil 20 is to reduce the output of the speed plate and not to cut it out entirely.

The hot plate is also arranged to be reduced in its output in response to a change in position of a switch not directly associated therewith. The upper 300 w. coil 30 is connected to line L through switch 5b and to line $L_1$ through switches 3b and 5c in series. Inasmuch as switch 5c is closed only when the casserole is used alone, it is only under this condition that the hot plate can be turned to "high."

The coils 50, 51 and 52 of the roaster are arranged to give 500 w. with coils 51 and 52 in series, and 1320 w. with coils 50 and 51 in parallel with each other and in series with coil 52. Coil 51 is connected at one end directly to line $L_1$ and at its other end directly to coil 52. Coil 52 is connected to line L through switch 4c. Coil 50 is connected at one end to coil 52 and at its other end to switches 2c, 4b and 1a in series, so that if any of them is open, coil 50 is de-energized. It will be seen that switch 1a is closed only in the "off" and "simmer" positions of switching unit A; that switch 4b is closed only in the "off" and "low" positions and switch 2c is closed whenever an attempt is made to connect the roaster on its "high" heat or to connect the broiler.

Fig. 2 of the drawings discloses an additional feature, that of utilizing heating elements of one unit to reduce the voltage drop across another unit and thereby reduce the power consumption of the latter. In this figure the same four types of heating units are shown, namely a speed plate, a hot plate, a casserole and a roaster-broiler. The speed plate includes coils 23, 24, 25, 26 and 27 of 700 w., 600 w., 350 w., 290 w. and 87 w. respectively, the last two ratings being "series ratings," that is, the capacity of the coils when used in series relationship with another coil of predetermined resistance.

Switching unit D is directly associated with the speed plate and includes eight individual switches marked 1d to 8d. It will be seen that in addition to its "off" position this switching unit has five heating positions similar to the form previously described, that is, a "simmer" position (160 w.), "low" (350 w.), "medium" (600 w.), "high" (950 w.) and "speed" (1650 w.).

The position tabulation immediately below the representation of the switch dial in Fig. 2 shows that the "simmer" heat of 160 w. is obtained by connecting the 87 w. series coil 27 in series with the 350 w. coil 25 through switches 5d and 3d. The "low" heat is obtained by using the 350 w. coil 25 alone, coil 27 being bridged out by reason of the fact that both ends are connected to the same potential, one end through switch 5d and the other end through switch 7d, which latter closes when the switching unit D is turned to the "low" position. This connection holds true when the "low" is established with the roaster unit off. When the roaster-broiler unit is turned on a different "low" heat is given, as will be described hereinafter.

The medium heat in the speed plate is obtained by using the 600 w. coil 24 alone, the "high" heat is obtained by using the 350 w. coil 25 and the 600 w. coil 24 in parallel, and the "speed" heat or 1650 w. is obtained by using the 700 w. coil 23 in parallel with coils 24 and 25.

In each instance the "medium," "high" and "speed" heats are also changed when the roaster-broiler is turned on so that the above values and connections hold only when the speed plate is used alone.

The hot plate in Fig. 2 contains two elements 32 and 33 of similar capacity, 320 w. each, which may be connected in series or in parallel or used alone to produce three heats of 160 w., 320 w. and 640 w. Switching unit E is directly associated with the hot plate and includes switches 1e to 6e, closed or opened according to the position tabulation given.

The casserole or sunken heating unit contains heating elements 42 and 43 of 225 w. and 150 w. respectively, which are arranged to be used alone or in parallel to give heats of 150 w., 225 w. and 375 w. The roaster-broiler unit is associated with the casserole in the same manner as in the form previously described, that is, it is controlled by the same switching unit. The roaster-broiler unit includes heating elements 54 and 64 respectively, of sufficient resistance to utilize 1320 w. when the voltage across them is the full line voltage. In this instance, the switching unit, designated F in the drawings, goes through the range of heats for the casserole and in its next position connects the roaster-broiler and disconnects the casserole. The switching unit contains individual switches, 1f to 8f, which are closed or open according to the position tabulation given in the drawings.

Referring now to the heat tabulations at the bottom of Fig. 2, it will be noted that when the speed plate is used alone the full 1650 w. is available. It will also be noted from the next tabulation that if the hot plate is turned on to give any of its heats up to and including the 640 w. "high" the speed plate is reduced to "high" or 950 w. by reason of the fact that the 700 w. coil 23 is taken out of the circuit. In this connection it will be noted that the 700 w. coil is connected to switches 4e, 5f and 8d in series, so that all of these switches must be closed in order for the 700 w. coil to be utilized. From an inspection of the position tabulations, it will be noted that switch 4e, for example, is closed only in the "off" position of the hot plate switching unit.

From the next tabulation it will be seen that with the hot plate and speed plate on, the casserole may be taken through any of its heats, but if turned on, will reduce the hot plate to "medium" or 320 w. because of the fact that the upper 320 w. coil 32 is de-energized. This coil may be connected to line $L_1$ through switches 3e and 2f in series and from the position tabulation of switching unit F it will be noted that switch 2f is open when the casserole is turned on. This prevents parallel operation of the coils 32 and 33 of the hot plate.

It will also be noted that with the speed plate off, the hot plate is limited to its "medium" position whenever the roaster or broiler is used, by reason of the fact that with the switching unit F in the position to connect the roaster or broiler, switch 2f is open. This switch being in series with switch 3e must necessarily be closed to establish parallel operation of the coils of the hot pate.

When the roaster is turned on connections are immediatey estabished to provide for series operation of the coils 37 and 33 of the hot plate or to provide for operation of the lower 320 w. coil alone. Assuming the speed plate to be on any of its heating positions through switching unit D, the series connection for the hot plate is established as follows: From line L to switch 5e to 6f to 1e to coil 32 to coil 33 to switch 2e to line L1. The output of the hot plate is thus 160 w. since the coils are connected in series.

Now, with the switching units E and F in the same position, if switching unit D is turned off, switch 1d is closed which places both ends of the upper 320 w. coil at the same potential, since both ends are connected to line L. The closing of switch 1d connects switch 5e to both ends of the upper 320 w. coil 32. This then raises the heat output of the hot plate to 320 w., since coil 33 will be used alone in the circuit.

The last heat tabulation indicates that the roaster utilizes 1320 w. only so long as the speed plate controlled by switching unit D is held at "simmer" or "off" positions. If the speed plate is turned above either of these two positions, that is to "low," "medium" or "speed," the roaster is reduced to 600 w. and the power is divided between it and the speed plate. The reduction in power in the roaster is caused by a reduction in the voltage drop across it. Coil 26 is placed in series with the roaster whenever switching unit D is turned above its "simmer" position to close switch 2d. It will be seen that the connection to the roaster is made directly to line L1 and through switches 1f and either through 6d to line L or through switch 2d, coil 26 and switch 3d to line L. Either switch 6d or switch 2d is constantly closed, the first in the "off" and "simmer" positions of switching unit D and the second in any higher position. The 290 w. series coil 26 is thus introduced into the circuit to reduce the voltage drop in the roaster, and limit the power consumption of the latter to 600 w.

In the event that the roaster is turned on, switch 3f is opened thus removing the "bridging circuit" for coil 27, putting the latter always in series with the 350 w. coil 25. The effect of this is to make the combination of coils 25 and 27 (160 w.) available as a substitute for the 350 w. output of coil 25 alone. Thus, instead of 350 w. the "low" for the speed plate with the roaster on becomes 160 w. from coils 25 and 27 and 290 w. from coil 26, a total of 450 w. Similarly, the "medium" becomes 890 w., being the heat from the 600 w. coil 24 in addition to coil 26. This is a maximum which can be obtained from the speed plate, regardless of whether the switching unit D is turned to the "high" or "speed" positions, since it is impossible to complete the circuit through the 700 w. coil 23 with the roaster on, since switch 5f is open.

Simplified forms of the invention are shown in Figs. 3 and 4. Fig. 3 incorporates two identical units each having the total permissible capacity, namely 1650 w., while Fig. 4 incorporates two dissimilar units, one of which has a total capacity of 1650 w. and the other a total capacity of 1000 w.

In the form shown in Fig. 3, hot plate 70 includes two coils of 825 w. capacity each when used alone on 110 v., the coils being numbered 71 and 72. Hot plate 73 includes two similar coils 74 and 75 also of 825 w. capacity each. In each instance the coils are adapted to be used in series across lines L—L1, giving a "low" of 412 w., the corresponding coils 71 and 74 in each unit are adapted to be used alone giving a "medium" of 825 w., and the two coils on each unit may be connected in parallel giving a "high" heat of 1650 w.

Hot plate 70 is controlled by switching unit G which includes switches 1g and 5g and hot plate 73 is controlled by switching unit H which includes switches 1h to 5h. It will be noted that in order to establish the "high" heat, it is necessary to connect the lower 825 w. coil, either 72 or 75. In the instance of coil 72 this connection can be established only by closing switches 2g and 3h, in order to connect the end of coil 72 to line L. Switch 3h is closed only when switching unit H is in its "off" position, so that the output of hot plate 70 is limited to the "medium" or 825 w. whenever switching unit H is turned to any of its positions except the "off" position.

In the same manner hot plate 73 is limited to 825 w. since, in order to establish the "high" heat, it is necessary to close switches 2h and 3g to connect the end of coil 75 to line L. Switch 3g is closed only in the "off" position of switching unit G.

It will be appreciated that by the above circuits, even though one hot plate is standing in its "high" position and utilizing 1650 w., it will be reduced to 825 w. as soon as the other hot plate is turned on and the latter may be turned through its entire heat range but will be limited to "medium," or 825 w., even though the operator moves the switching unit to its "high" position.

Fig. 4 shows a circuit for a range having two surface units 80 and 81, one surface unit being a speed plate including coil 82 of 1000 w. capacity on 110 v., and coil 83 of 650 w. capacity on 110 v. It will be apparent that when used in series a "low" heat of 394 w. is available and when used in parallel the two coils give a total of 1650 w.

The other unit shown, hot plate 81, includes a coil 84 of 650 w. capacity and a coil 85 of 350 w. capacity. When used in series, the coils 84 and 85 give 227 w. and when used in parallel give 1000 w. The circuit is so arranged that in each instance the hot plate and speed plate coils may be used in series, either coil alone, or in parallel so that four different heats are available from each unit.

The speed plate 80 is controlled by switching unit J which includes switches 1j to 6j and hot plate 81 is controlled by switching unit K which includes switches 1k to 6k. The position tabulation below the representation of the dial of each switching unit shows which of the various switches are closed and which are open for the several heat positions.

The maximum output of speed plate 80 is obtained, as above noted, by using coils 82 and 83 in parallel across lines L—L1. The connection to line L1 is made through switch 4j and the connection for coil 82 to line L is made through switch 6j. The connection of coil 83 to line L is made through switch 1k in series with switch 5j. It will be seen that switch 1k is closed only when the hot plate switching unit stands in its "off" position, so that only at this time can the total capacity of the speed plate be used.

The "high" heat of 1000 w. which is available from hot plate 81 can be established only when the coils 84 and 85 are used in parallel across lines L—L₁. The connection from each to line L₁ is established through switch 4k and the connection of the 650 w. coil 84 to line L is established through switch 6k. The connection of coil 85 to line L, however, is established through switch 1j and 5k in series, so that in order to connect this coil to line L, switching unit J must stand in its "off," "low" or "medium" position since these are the only positions in which switch 1j is closed. As soon as switching unit J is moved above the "medium" position to its "high" or "speed" positions, switch 1j is opened and it is impossible to utilize the "high" heat of hot plate 81 even though the switching unit K stands in the "high" position.

It will be seen that the present invention provides a circuit for an electric heating device having a plurality of heating units, each of which includes more than one heating element the total power consuming capacity of which is greatly in excess of the permissible value established by the power companies and underwriters' laboratories as being safe to draw from a single domestic outlet. The circuit in each instance is so arranged that the several switching units directly associated with each of the heating units include interlocking switches capable of modifying the connections to certain heating elements of other units. While the invention has been described in connection with particular specific circuits, it will be appreciated that various modifications and changes may be made without departing from the spirit of the appended claims.

What I claim as new and desire to secure by United States Letters Patent is:

1. The circuit for an electric heating device having a plurality of heating units each including more than one heating element and the total power consuming capacity of all of which units is in excess of a predetermined permissible value which includes, a power source, a switching unit directly associated with each heating unit, a coil in one of said heating units, a switch in the switching unit directly associated with said last named heating unit in circuit with at least one heating element of another heating unit and with said coil whereby said coil is placed in series with said other heating element and with said power source when said switch is closed to reduce the voltage drop across said other heating element and thereby limit the power consumption thereof.

2. Electrical heating apparatus comprising power lines and a plurality of heating units, said heating units comprising a plurality of heating elements, a separate switching unit for each heating unit for connecting the power lines to the units, each of said heating units being operable at a high heat and at a lower heat, and electrical connections between the switches preventing the changing of power consumption of any of said heating units to its high heat when such increase in the heating would exceed a predetermined limit for the entire device, and changing the power consumption of any of said units from the high heat to a lower heat when other units are turned on so that the sum of them with the high heat previously used would exceed said predetermined limit, the electrical connections between the switches inserting a heating element in one unit in series with a heating element of another unit to reduce the voltage drop across the latter when the power consumption of the entire apparatus would otherwise exceed the predetermined limit.

3. Electrical heating apparatus comprising power lines and a plurality of heating units, at least three of said heating units having a plurality of heating elements, a separate switching unit for each heating unit for connecting the power lines to the units, at least three of said switching units being operable to connect the elements of their respective heating units to the power lines for high, intermediate, and low heats, and electrical connections between said last named switches whereby energization of a first unit will reduce the heating effect of a second unit from high to intermediate and energization of a third unit will reduce the heating effect of said first unit from high to intermediate, said second unit remaining at intermediate, whereby the power consumption of all of said heating units is held below a predetermined maximum.

KEMPER M. HAMMELL.